July 11, 1967  P. N. GARAY  3,330,392

CENTRIFUGAL ROLLER TORQUE CONVERTER

Filed Feb. 1, 1965

SECTION A-A

*INVENTOR.*

Paul N Garay

United States Patent Office 3,330,392
Patented July 11, 1967

3,330,392
CENTRIFUGAL ROLLER TORQUE CONVERTER
Paul Nicholas Garay, Crockett, Calif.
(756 Camino Ricardo, Moraga, Calif. 94556)
Filed Feb. 1, 1965, Ser. No. 429,314
2 Claims. (Cl. 192—103)

There are a large number of variable ratio power transmission devices presently available; however, many of them depend upon friction, fluid turbulence, or slip to achieve their transmission characteristics. The usual result is a reduction in efficiency when the device is operated at other than the optimum of design condition; this inherent inefficiency results in the generation of heat, which limits the capacity of the device. Furthermore, those devices which utilize friction in their operation are subject to slippage, and are limited in their output.

The variable ratio power transmission will maintain good efficiency over a large range of input-output ratios, may be stalled on the output side without excessive heat generation, is compact, and relatively simple. Furthermore, any configuration of this may be readily adjusted to alter the power transmission characteristics within wide limits.

The variable ratio power transmission device herein described consists essentially of a driving and a driven shaft, which are connected by an intermediate mechanism such that the ratio of the speed of the driven shaft to the speed of the driving shaft is a variable. The speed ratio is dependent on the torque which is to be transmitted through the device, and upon the mechanical characteristics of the design. The output speed varies in respect to the input speed in inverse ratio to the torque which is transmitted through the device.

The operation of the device is continuous and automatic and the power transmission characteristics are inherent in the mechanical design of the parts of the device.

FIGURE 1 shows the contact wheels 1 which bear upon the thin plate 3, and as they are pivoted on axis fixed to the driven shaft 5, cause the driven shaft to rotate.

Figure 1:
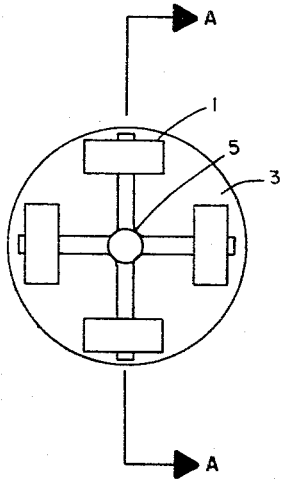
Figure 2:
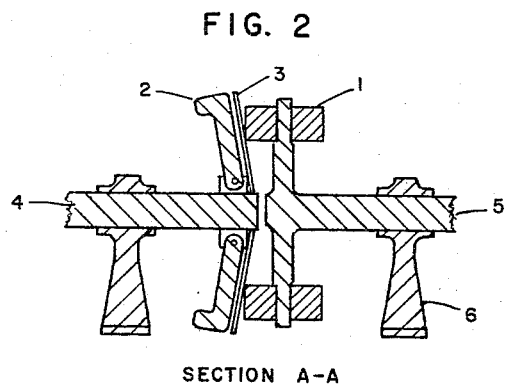
FIGURE 2 is a cross section of the device in a plane passed through a longitudinal centerline. The section shows the relationship of the various elements of the entire device.
Figure 3:
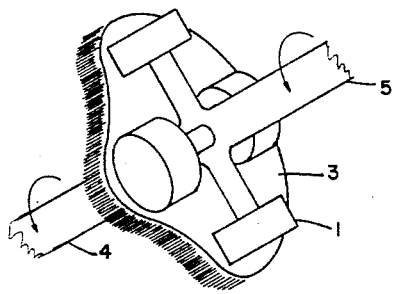
FIGURE 3 shows in perspective the complete device, and especially the distortion of the plane of the swinging weights which produces the driving force upon the driven element.
Figure 4:
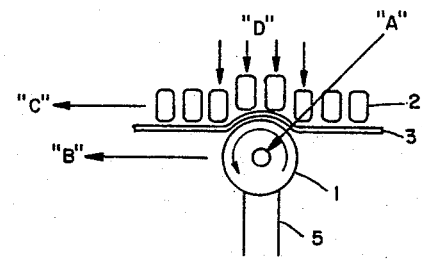
FIGURE 4 is a diagrammatic plan view and will be used to explain the operation of the device. In this drawing, the pivoted weights are depicted as moving in a straight line, whereas in reality they move in a circular path defining a plane as described.

The complete device may be implied from the cross sectional view. The parts are as follows: The driving shaft 4, which carries a set of pivoted weights 2. The weights are so mounted and shaped that when the driving shaft is rotating, the weights form an essentially plane disc normal to the axis of rotation. The thin plate 3 is a flexible metal or plastic disc which serves to provide a smooth face to the disc which is comprised of the pivoted weights.

The driven shaft 5 has rigidly affixed to it a number of axes, normal to the axis of rotation, which carry the contact wheels 1. These contact wheels are so placed that they intrude into the plane of the thin plate. The interference results in forces which have a resultant such that the driven shaft is caused to rotate. Suitable shaft supports 6 are provided to support and maintain the various elements in their proper relationship.

The pivoted weights 2 moving in the direction indicated by arrow C tend to align themselves in a plane (which is represented by a line in the theoretical schematic) because of centrifugal force. However, contact wheel 1 which protrudes into the plane of the pivoted weights, causes each weight to be displaced as the weight moves past the contact wheel. The forces shown by arrows D are due to the displacement of the weights. The forces occurring as the weights approach the contact wheel have greater effect than the forces which occur as the weights recede from the contact wheel; the discrepancy in the summation of these forces is represented by the force arrow A, which acts upon at an angle to the axis of rotation of the driven shaft, but normal to the axis of the contact wheel. Arrow B represents a resultant force acting normal to the axis of rotation of the driven shaft, as well as normal to the axis of the contact wheel, so that a rotative effort is exerted upon the driven shaft 5. The thin plate 3 is used to enhance a smooth motion between the contact wheels and the pivoted weights.

This device has a number of features, the combination of which is not found in other devices of similar purpose. These advantages are:

(1) Simplicity, compactness and dependability; lack of critical adjustments.

(2) High efficiency at all speed ratios, since speed reduction is not accompanied by frictional losses, slippage or fluid turbulence.

(3) Heat production is minimized because the efficiency remains high at all speed ratios.

(4) Inherent automatic action.

While there has been here described what is a simplified form of the invention, it will be apparent to those skilled in the art that the details of this device may vary from those described without departing from the scope of the invention.

What is claimed is:

1. A device for transmitting torque between a driving shaft and a driven shaft comprising: a plurality of elongated weight members, pivot means pivotally connecting one end of each member to said driving shaft whereby said driving members extend circumferentially around said driving shaft, at least one roller rotatably mounted on said driven shaft, said roller having an axis of rotation relative to said driven shaft which extends radially outwardly from said driven shaft, the other ends of the said weight members being pivoted outwardly by centrifugal force during rotation of said driving shaft so as to be in substantial coplanar relationship and in rolling engagement with said roller means.

2. A device as defined in claim 1 further including a flexible disc mounted on said driving shaft and extending outwardly therefrom and between said weight members and roller.

References Cited

UNITED STATES PATENTS

| 1,683,954 | 9/1928 | Carrey | 192—105 |
| 2,074,510 | 3/1937 | Junkers | 192—105 X |
| 2,956,656 | 10/1960 | Becksted | 192—30 X |

FOREIGN PATENTS

| 219,233 | 1/1958 | Australia. |
| 286,930 | 9/1918 | Germany. |

BENJAMIN W. WYCHE, III, *Primary Examiner.*
DAVID J. WILLIAMOWSKY, *Examiner.*